Nov. 18, 1958
G. B. MARSDEN
2,860,706
PIPE CUT-OFF MACHINES
Filed June 6, 1952
6 Sheets-Sheet 1
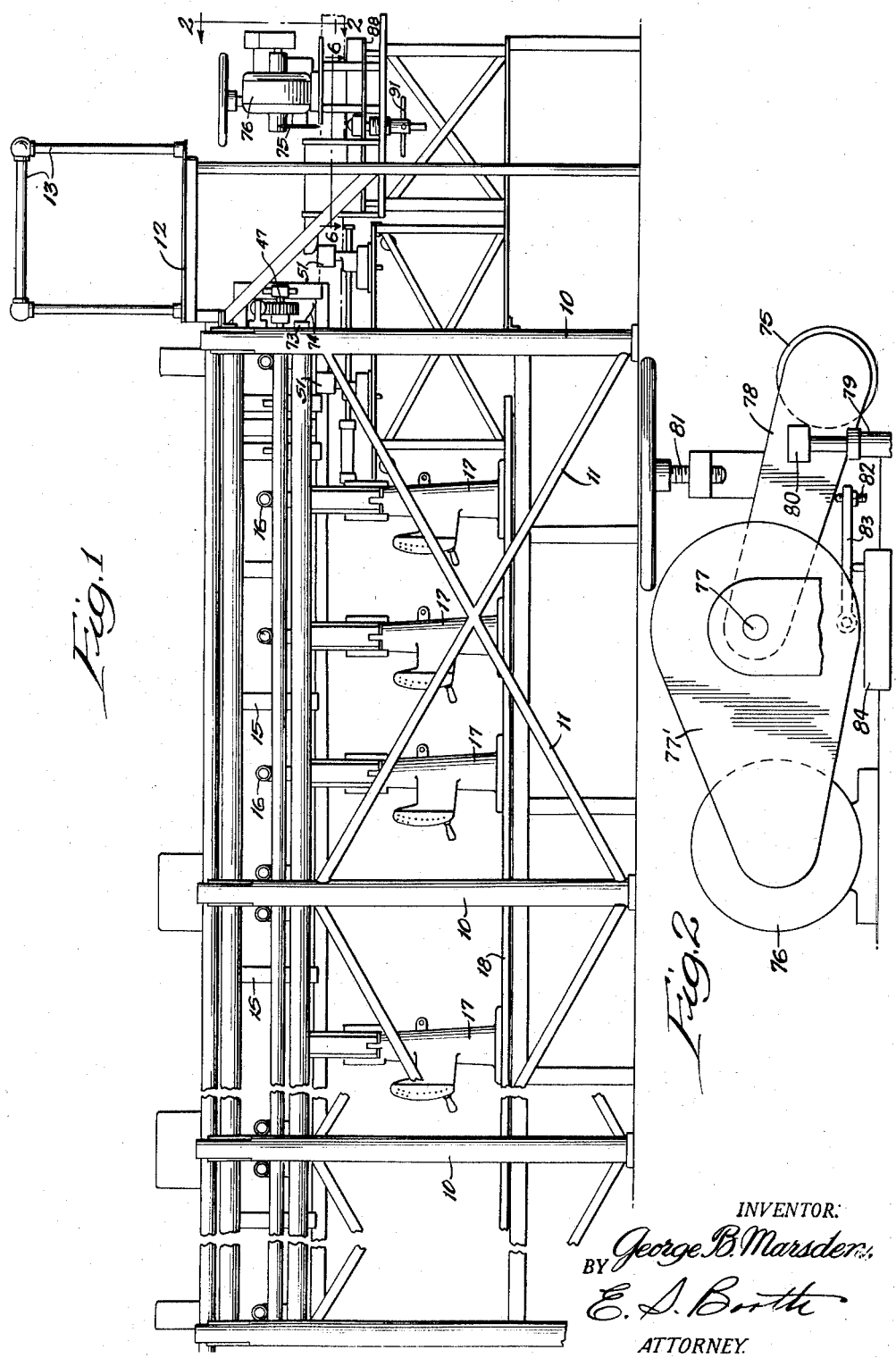
INVENTOR:
George B. Marsden
BY
E. S. Booth
ATTORNEY.

Nov. 18, 1958 G. B. MARSDEN 2,860,706
PIPE CUT-OFF MACHINES
Filed June 6, 1952 6 Sheets-Sheet 2
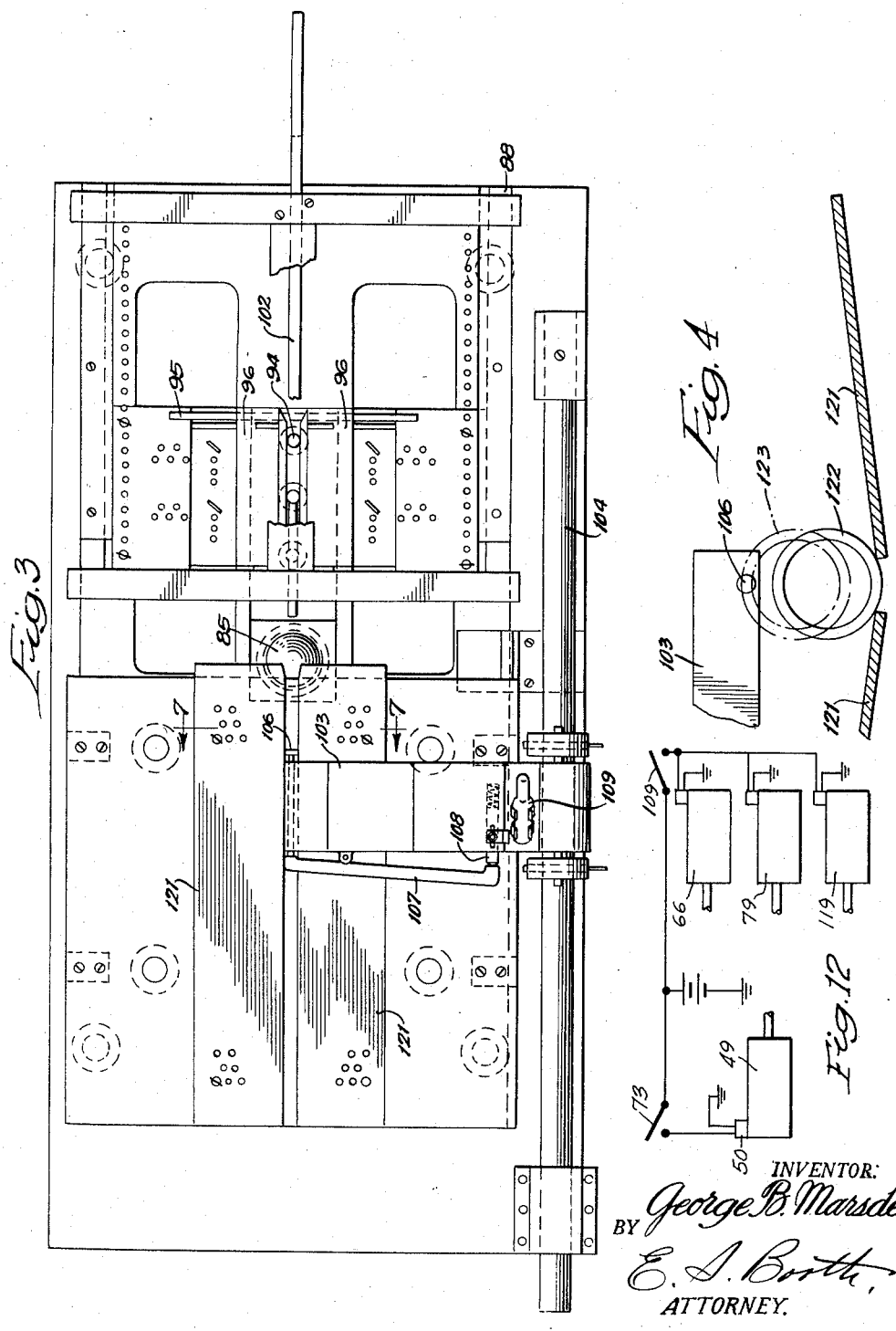
INVENTOR:
George B. Marsden,
BY
E. S. Booth
ATTORNEY.

Nov. 18, 1958   G. B. MARSDEN   2,860,706
PIPE CUT-OFF MACHINES
Filed June 6, 1952   6 Sheets-Sheet 3
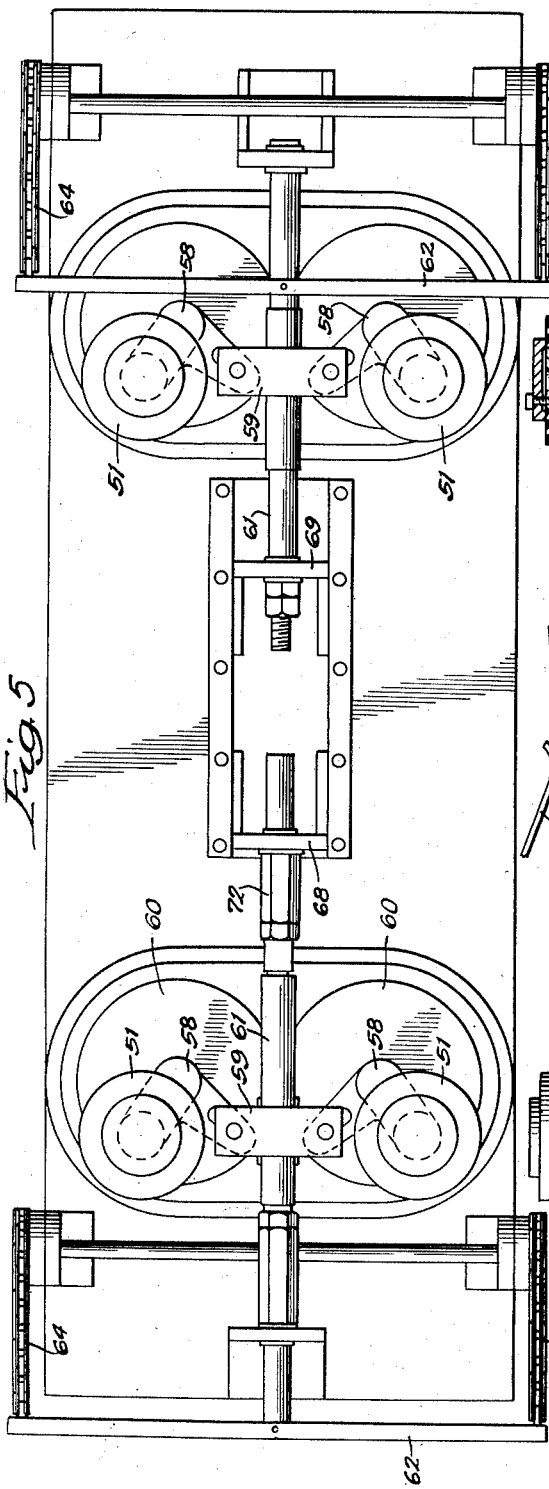
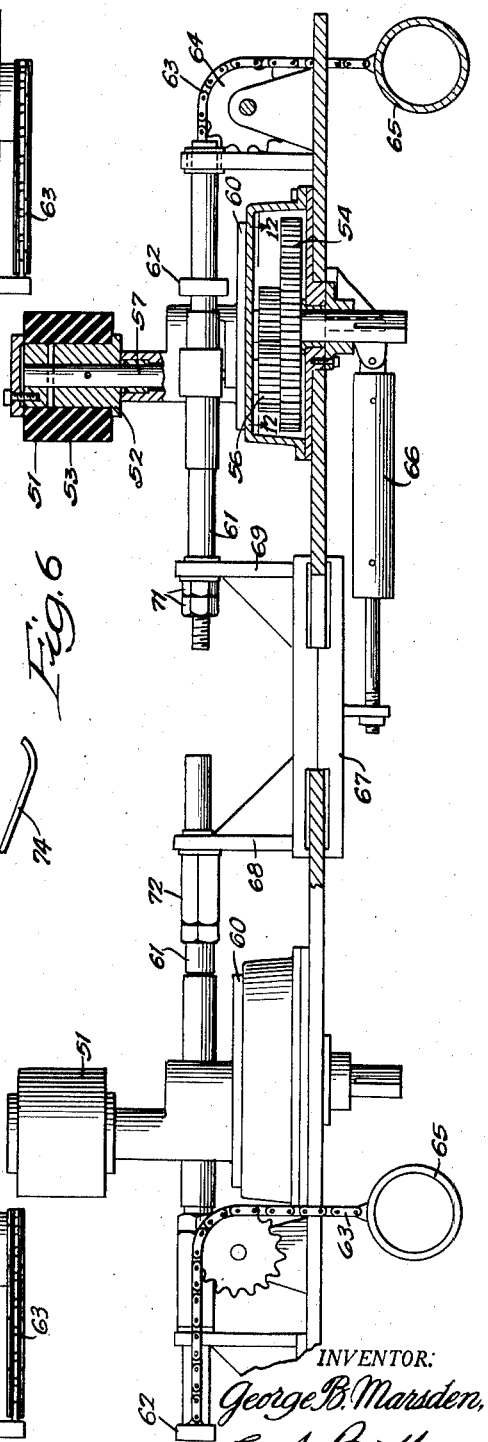
INVENTOR:
George B. Marsden,
E. S. Booth
ATTORNEY.

Nov. 18, 1958    G. B. MARSDEN    2,860,706
PIPE CUT-OFF MACHINES
Filed June 6, 1952    6 Sheets-Sheet 4
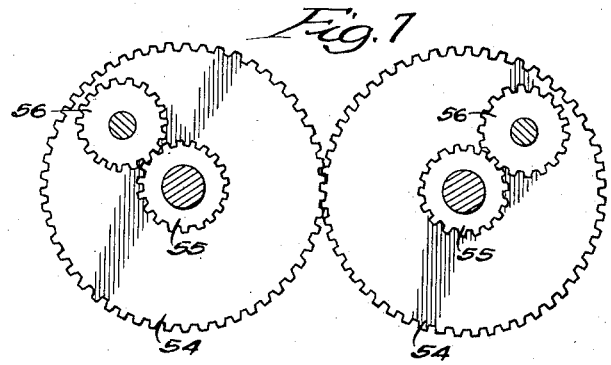
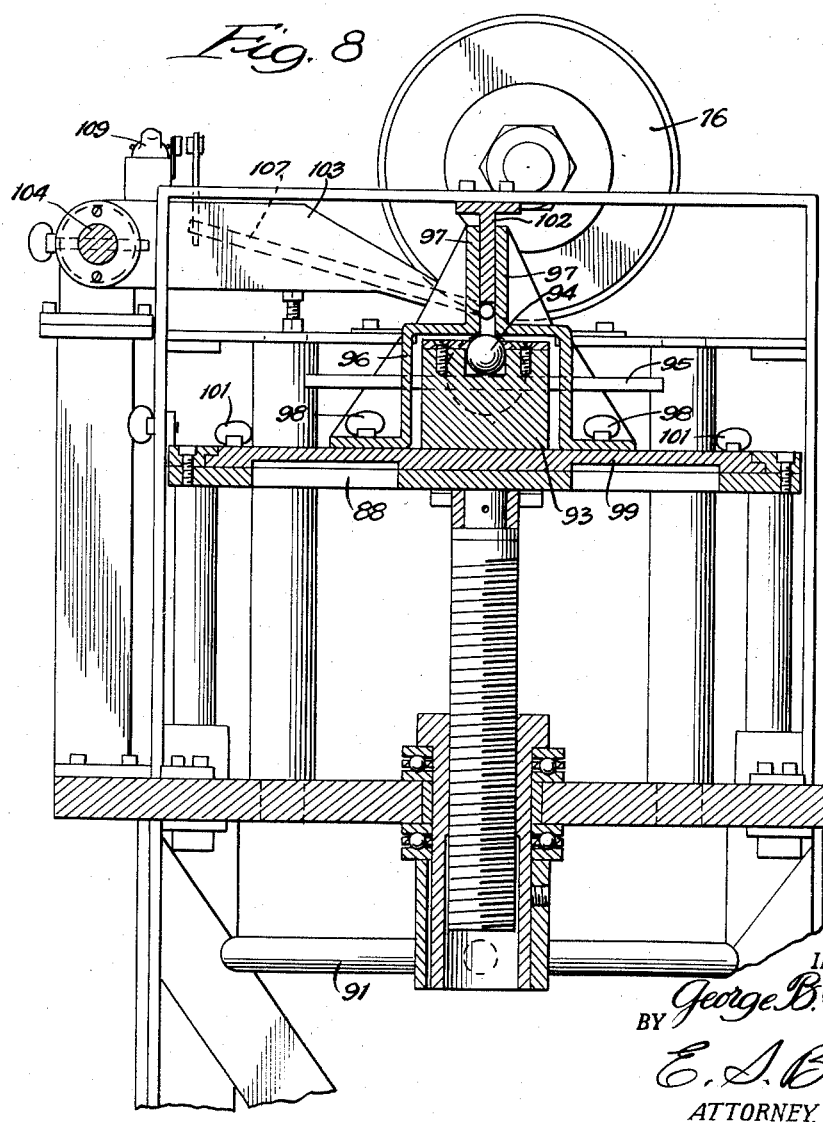
INVENTOR:
George B. Marsden,
BY
E. S. Booth
ATTORNEY.

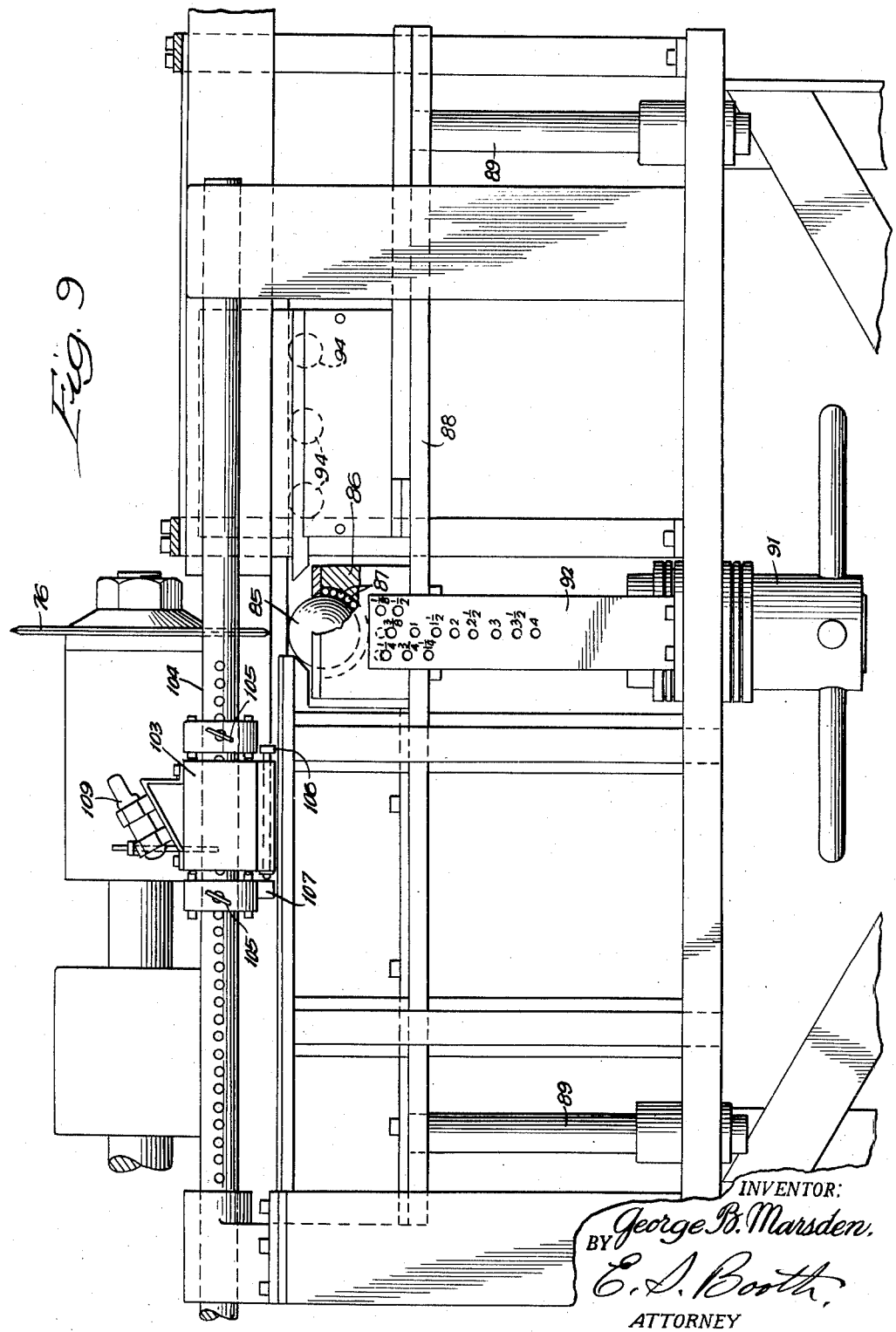

Nov. 18, 1958 G. B. MARSDEN 2,860,706
PIPE CUT-OFF MACHINES
Filed June 6, 1952 6 Sheets-Sheet 6
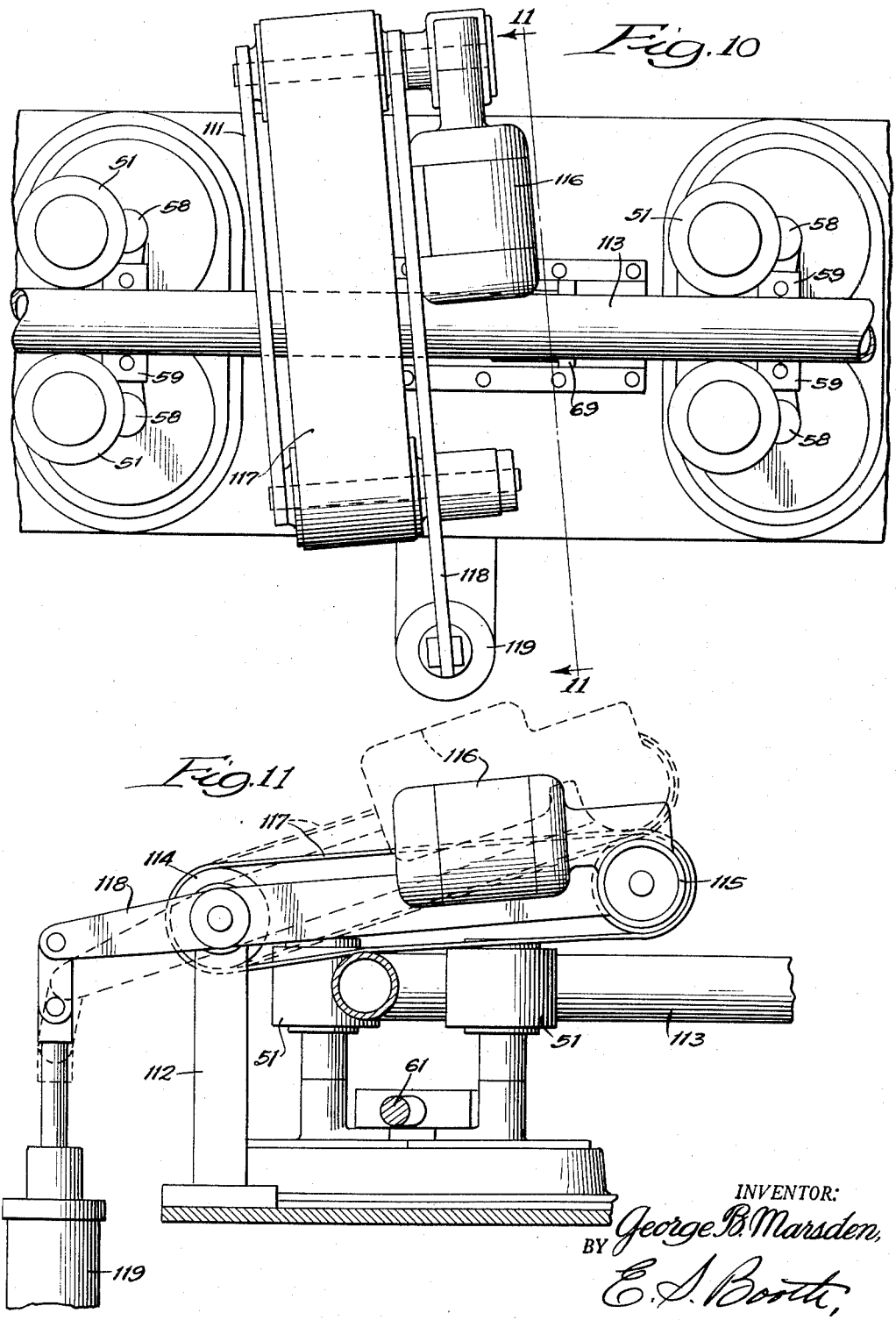
INVENTOR:
George B. Marsden,
BY
E. S. Booth,
ATTORNEY.

United States Patent Office 2,860,706
Patented Nov. 18, 1958

2,860,706

PIPE CUT-OFF MACHINES

George B. Marsden, Chicago, Ill., assignor to Chicago Nipple Manufacturing Company, Cicero, Ill., a corporation of Delaware Application June 6, 1952, Serial No. 292,088

14 Claims. (Cl. 164—61)

This invention relates to pipe cut-off machines and more particularly to a machine for automatically cutting pipes into desired lengths.

In cutting pipes into lengths, as for example, in nipple manufacture, the pipe to be cut has generally been supported by an elongated supported means for rotation and for longitudinal sliding and has been advanced by hand past a cutting station. After the pipe has been advanced to the desired extent as determined by a stop, the operator holds the pipe against the stop while giving it an initial turn and moves a rotating cutting disc into an engagement with the pipe to cut off the end thereof, the pipe being rotated by the disc during cutting. It is necessary that the pipe be held against the stop to prevent possible lengthwise movement of the pipe which would result in a spiral cut. If the pipe is not given an initial turn the blade itself must exert the entire turning force and will scrape across the pipe with resultant rapid wear of the blade. Upon completion of the cut-off, the operator again advances the pipe by hand and repeats the operation until the pipe has been entirely cut into desired lengths. When one pipe is finished, a new pipe is moved by hand from a storage rack to the supporting means to be cut.

This operation requires heavy and tiresome manual labor, particularly when relatively large pipes are being cut. It furthermore requires a high degree of skill to achieve satisfactory speed and at best, the operation is relatively slow.

It is one of the objects of the present invention to provide a pipe cut-off machine which automatically feeds the pipe and cuts it into the desired lengths.

Another object is to provide a machine in which pipes of widely varying sizes can be handled by a few simple adjustments.

According to one important feature of the invention, pipes of all sizes are supported by the machine with their tops at the same level so that minimum adjustment of the cutting wheel and of the other parts of the machine is required.

Still another object is to provide a machine in which new pipes are automatically fed into the machine from a storage rack as the pipes are cut.

A further object is to provide a machine in which the cut-off lengths are positively fed from the machine in a controlled manner and in which short ends of pipe are rejected separately from the desired lengths.

A still further object is to provide a machine in which the pipe is held against the stop and is given an initial turn before being engaged by the cutting knife.

A specific object is to provide a machine in which the pipe is supported by a ball during cutting so that the ball will wear uniformly over its surface and will tend to reduce burrs on the pipe ends at the cut off point.

The above and other objects and features of the invention will be more readily apparent from the following description, when read in connection with accompanying drawings in which:

Figure 1 is a side elevation of a machine embodying the invention;

Figure 2 is a partial front elevation on the line 2—2 of Figure 1 showing the cut-off wheel and drive;

Figure 3 is a partial top plan view with parts broken away of the support means, the stop, and the ejecting means;

Figure 4 is a partial section on the line 7—7 of Figure 3;

Figure 5 is a plan view of the pipe feeding means;

Figure 6 is a side view of the pipe feeding means with parts in section;

Figure 7 is a partial diagrammatic view of the drive gear for the feeding means;

Figure 8 is a partial transverse section of the pipe supporting member and guide means;

Figure 9 is a view at right angles to Figure 8 with parts in section;

Figure 10 is a partial plan view showing the pipe turning mechanism;

Figure 11 is a section on the line 11—11 of Figure 10; and

Figure 12 is a circuit diagram of the control circuit.

The machine of the invention comprises an elongated frame which carries rack means on which the pipes to be cut are supported. Supporting means are provided to hold individual pipes during cutting thereof and the pipes are transferred individually from the rack to the supporting means by a transfer mechanism.

A pipe on the supporting means is fed by power-driven feeding means past a cut-off mechanism which functions to cut the pipe into lengths. As the pipe is fed, it engages a stop device which limits feeding so that the desired length will be cut off and which also contains control means operated by engagement of the pipe therewith to control the cut-off mechanism and feeding means. Cut off lengths of pipe are held in a manner to clear the stop and are positively forced from the machine by the advancing pipe.

The frame and rack structure

The machine comprises an elongated framework including a series of upright posts 10 connected by cross braces 11 and which may be of any desired length and height depending upon the length and sizes of pipes to be handled. At one end the frame may carry a cat walk 12 provided with railings 13 and preferably having a hinged door thereon through which an operator can obtain access to the machine parts below the cat walk. The frame carries a series of transversely extending rack bars 15 which lie at an angle to horizontal to receive pipe to be cut. The rack bars 15 terminate at their lower ends spaced from the side of the frame and a second series of rack bars 16 are supported below the rack bars 15 sloping in the opposite direction. The rack bars 16 terminate at their lower ends approximately centrally of the frame and near the top thereof.

The rack bars 15 are adapted to receive bundles of pipe which may be placed thereon by a crane or the like. When the pipe bundles are separated, the pipe will run down the rack bars 15 and drop into the rack bars 16. Pipe may be loaded to fill the rack bars 16 completely and to extend over into the rack bars 15, but in most cases, all of the pipe loaded into the racks at any one time will be held by the rack bars 16. The pipe preferably lies on these rack bars in a single layer, and tends to roll down the rack bars and off of the lower ends thereof.

Individual pipes discharged from the rack bars 16 are adapted to be held in a cutting position by an elongated supporting means comprising a series of vertical pedestals 17 carried on a sub-frame 18 within the main frame 10.

The pedestals 17 are constructed to support pipes of different sizes for rotation and for longitudinal feeding movement and are adjustable to hold the pipes with their tops at the same level.

The pedestals lie below the lower ends of rack bars 16 and length of pipe are transferred singly from the rack bars to the pedestals, as more particularly described and claimed in my co-pending divisional application.

The feeding means

A pipe held on the supporting means is adapted to be fed past a cut-off station by power operated feeding means which is best shown in Figures 5 to 7. The feeding means comprises two pairs of driving rolls 51 which are mounted on vertical axis with the rolls of each pair lying on opposite sides of the pipe. The rolls preferably comprise metallic hub portions 52 which are covered with a yielding material such as rubber sleeves 53 to grip the pipe and to advance it positively through the machine.

The rolls are driven through a differential type gear mechanism including a pair of relatively large gears 54 mounted in intermeshing relationship on vertical shafts and one of which may be driven through a motor not shown. Each of the gears 54 carries coaxially therewith a pinion 55 and the pinion 55 in turn, meshes with drive pinions 56. The pinions 56 are carried by shafts 57 on which the rolls are mounted and the shafts 57 are supported by bell cranks 58 pivoted at their centers coaxially with the gears 54. The bell cranks 58 may be formed by projections on plate 60 which are rotatable on the casings for gears 54—56 coaxially with the gears 54. In this way, the rolls can swing towards and away from each other into and out of driving engagement with the pipe while being continuously driven.

The rolls of each pair are normally urged towards each other through a yielding mechanism so that they will grip pipes of different sizes. As shown the free arms of the bell cranks 58 are slotted to receive pins carried by a cross head 59 which is supported on a rod 61. The rod 61 carries a cross bar 62 whose opposite ends are connected to chains 63 which run over idler sprockets 64 and carry weights 65. The weights 65 may be in the form of pipes as shown and are preferably such that they can easily be changed so that a greater driving pressure can be exerted by the rolls on larger pipes. It will be noted that each pair of rolls is separately controlled by its own weight mechanism so that both sets of rolls will grip the pipe uniformly regardless of uneven wear or irregularities in the pipe.

To separate the rolls to release the pipe, a fluid motor 66 is provided. The piston of the motor 66 is connected to a slide 67 which is mounted for sliding movement on the base of the drive mechanism. The slide 67 has a pair of flanges 68 and 69 projecting upward therefrom and which are formed with openings through which the rods 61 respectively extend. The right hand rod 61 projects slidedly into an opening into the flange 69 and is threaded at its outer end to carry stop nuts 71 so that when the slide is moved to the left, the rod will be pulled to shift the cross head 69 to the left and rock the bell crank levers 58 in a direction to separate the rolls. The rod 61 on the left hand side extends slidedly into an opening in the flange 68 and carries a stop nut 72 in the left side of the flange so that it will be moved to the left when the slide is moved to the left. When the slide is moved to the right to the normal operating position, the rods 61 can move independently due to their sliding engagement with the flanges 68 and 69 so that the rolls of each pair are separately controlled to engage the pipe.

The feeding rolls are mounted towards the right end of the frame as seen in Figure 1 in such a position that a pipe fed to the supporting means by the transfer mechanism will have its forward end lying longitudinally between the two pairs of rolls. Thus when a pipe is first fed into the machine, it will be engaged and fed only by the rear set of rolls and the end of a pipe passing the front set of rolls will be released and will thereafter be advanced by engagement of the following pipe therewith.

To control the supply of pipes from the rack into the machine by the transfer mechanism, a control switch 73 is mounted on the frame and has an operating finger 74 extending between the pairs of feed rolls to engage a pipe being fed. As long as the finger 74 engages a pipe, it will hold the switch 73 open. When the end of a pipe being fed passes beyond a finger 74, it is released and allows the switch 73 to close. The switch 73 is connected to a valve 50 to control the fluid motor 49 so that as soon as the switch is closed, the transfer mechanism will be operated to feed a new pipe from the rack into the supporting means with its forward end ahead of the rear set of rolls 51 to be gripped and advanced thereby. As pointed out hereinafter, this operation will always occur when rolls are separated so that the pipe will be received properly between the rolls to be fed thereby.

The cut-off mechanism

The pipe being advanced through the machine is cut off into lengths at the right end of the machine by a rotating cut-off wheel 75 which is driven by a motor 76. As best seen in Figure 2, the motor 76 drives an intermediate shaft 77 through a belt drive inclosed in a belt housing 77' and the shaft 77 drives the cut-off wheel 75 through a belt inclosed in a hollow arm 78. The cut-off wheel 75 is supported on the arm 78 which is pivoted coaxially with the shaft 77 for vertical movement downwardly into engagement with a pipe to cut it off or upward away from the pipe so that the pipe can be fed beneath it. The arm 78 is controlled by a fluid motor 79 whose piston rod is connected to a lug 80 on the arm and which raises the arm to an upper postion limited by an adjustable stop screw 81 or to a lower position determined by an adjustable stop screw 82 on a switch operating arm 83. The arm 83 controls a switch 84 which in turn controls the fluid motor 79 in a direction to raise the arm 78, so that when the arm 78 has moved down a sufficient distance to cut through the wall of the pipe, it will be moved upward away from the pipe ready for the next feeding operation. The adjustments 81 and 82 are provided to take care of wear in the cutting wheel 75 and also to set the wheel for different thicknesses of cut as required for pipe of different sizes, having different wall thicknesses. The cutting discs however, will always move back to the same upper position which is just high enough to clear the top of the pipe and will be moved downward a sufficient distance only to cut the pipe so that a very small amount of movement is involved.

During cutting, the pipe is supported on a supporting member shown as a ball 85 mounted in a block 86 for universal rotation. As shown, the block 86 is formed with a partially spherical recess of larger diameter than the ball 85 and a series of small bearing balls 87 are mounted in the recess to support the ball 85 for free rotation. The ball 85 is mounted directly beneath the cut-off wheel 76 and holds the pipe so that it can rotate in response to rotation of the cut-off wheel during a cutting operation. The ball 85 can also rotate for free lengthwise movement of the pipe during feeding.

The block 86 is carried by a vertically adjustable frame 88 which is supported in the main frame on guide pins 89 for vertical adjustment. To adjust the position of the frame 88 a hand wheel 91 is provided which carries a screw extending upward through the main frame and engaging the frame 88. Preferably a guide strip 92 is mounted adjacent to the frame 88 and is formed with openings therein corresponding to the different sizes of pipe to be handled and through which locking pins may be inserted to engage the frame 88 and positively to fix the position thereof. This adjustment as with the adjustment of the supporting pedestals is made to support pipes of different sizes with their top surfaces at the same level.

The guiding means

Between the feeding means and the cut-off mechanism, the pipe is supported and is accurately guided by a guiding means carried by the vertically adjusted frame 88. As best seen in Figures 3, 8 and 9, the guiding means comprises an elongated block 93 resting on the frame 88 and carrying at its upper end a series of balls 94 on which the pipe is supported for rotation and for longitudinal sliding movement. The block 93 carries a cross pin 95 which extends slidedly through side guide members 96 to hold the block and side guide members in longitudinal alignment while permitting lateral adjustment of the side guide members relative to the block. As shown in Figure 8 the side guides 96 have offset upper portions which extend over the top of the block 93 and which terminate in spaced vertical guide flanges 97. The side guides can be adjusted laterally of the block 93 to any desired position and secured in such position by pins 98 which are insertable in selected openings in a plate 99 on which the block and side guides are mounted. The plate 99 is slidedly carried on the frame 88 for longitudinal adjustment and can be secured in adjusted position thereon by pins 101 fitting through registering openings in the plate 99 and the frame 88. In this way, the block and side guide assembly can be moved longitudinally towards and away from the cut-off mechanism for different lengths of pipe which are to be cut.

The pipe is further guided by means of a top guide tongue 102 carried by the main frame and projecting downward between the side guide flanges 97 as shown in Figure 8. To adjust the mechanism for different pipe diameters, the entire guide assembly will move vertically with the frame 88 as it is adjusted for different pipe sizes so that the balls 94 will engage and support the pipe at the same level as the cut-off ball 85. The side guides can be moved laterally so that they will engage the sides of the pipe and hold it properly centered on the balls 94 while permitting the pipe to rotate and to move longitudinally. Since the top of the pipe is always at the same level, the top guide 102 can be fixed and will slidedly engage the top of the pipe to hold it against accidental tilting.

The guide assembly is preferably adjusted longitudinally on the frame 88 by shifting the plate 99 longitudinally to a position such that the forward ball 94 is approximately the same distance from the cut-off ball 85 as the desired cut-off length.

As a pipe is fed through the machine and is cut off, it will be supported and guided by the guide structure until the short end of the pipe passes beyond the guide structure. If the end is shorter than the desired length, it will leave the guide structure before it is engaged by the cut-off ball 85 and will fall out of the machine between the guide structure and the cut-off ball. In this way, short pipe ends are discharged ahead of the cut-off mechanism and do not become mixed up with the cut-off lengths.

The stop and control mechanism

To determine the length of pipe which will be cut during operation, stop means are provided to engage the end of the pipe beyond the cut-off position. As shown, this stop means comprises an arm 103 slidedly carried by a rod 104, fixed on the frame and adapted to be held in any desired position on the rod by pins 105, extending through openings on the arm and into drilled openings in the guide rod 104. In this way the stop arm can be set at any desired distance beyond the cut-off position for any desired length of cut-off.

The stop arm carries control means shown as a pin 106 extending slidedly through the stop arm and engaging a lever 107 pivoted on the forward side of the stop arm. The lever 107 operates a plunger 108 which is connected to a tiltable control switch 109 to operate it. The switch 109 is normally in the position shown in Figures 3, 8 and 9 and is tilted to its opposite position to establish a different set of contacts when the plunger 106 is engaged and moved by the end of a pipe.

The stop arm 103 is positioned at a level such that its lower end which carries the plunger 106 will be in line with the top edge only of a pipe fed through the machine. As the pipe is fed past the cut-off station, the upper edge of its forward end will engage the plunger 106 to operate the switch 109 and will positively engage the stop arm 103 so that further feeding movement thereof will positively be stopped when the desired length of pipe has been fed.

The switch 109 controls the motor 66 for the feeding mechanism and also controls the motor 79 for the cut-off wheel. When the switch 109 is in its nomal disengaged position shown, it will energize the motor 66 to shift the slide 67 to the right as seen in Figures 5 and 6 so that the driving rolls 51 will be moved together into driving engagement with the pipe by the weights 65. At the same time, the motor 79 will be operated to move the arm 78 and the cut-off discs upward. When the switch 109 is turned by movement of the plunger 106 by a pipe, the motor 66 will be energized to shift the slide 67 to the left and separate the driving rolls 51 as shown in Figures 5 and 6. At the same time, the motor 79 will be energized to swing the cutting disc downward into cutting engagement with the pipe to cut therefrom the end portion which projects beyond the cutting disc.

As soon as the end of the pipe has been cut off it will fall away from the stop thereby releasing the plunger 106 and allowing the switch 109 to return to its normal feeding position. If, during the feeding operation, the rear end of a pipe should pass beyond the control lever 74, the transfer mechanism will be energized to supply a new length of pipe to the supporting means. However, by the time this length of pipe is discharged from the transfer mechanism, the pipe remaining in the machine will have engaged the plunger 106 so that the feed rolls 51 will be separated to receive the new length of pipe.

The pipe turning and holding mechanism

In order to hold the end of the pipe against the stop during cutting and to give the pipe an initial turn before engagement thereof by the cutting knife the mechanism best shown in Figures 10 and 11 is provided. This mechanism includes a frame 111 pivoted at one end on a post 112 and lying above the pipe as shown at 113. The frame carries pulleys 114 and 115 at its opposite ends and the pulley 115 is driven by a motor 16. A flexible belt 117 stretches over the pulleys and is driven by the pulley 115 so that it will engage and turn the pipe 113 when the frame is in its lowered position as shown in full lines in Figure 11.

The frame is swung about its pivot on the post 112 between an active lowered position as shown in full lines and an inactive raised position as shown in dotted lines. For this purpose an extension 118 is provided on the frame and is connected at its outer end to the piston of a hydraulic motor 119. When the motor 119 pulls down on the extension to raise the frame the belt will disengage the pipe and it can be advanced freely by the feed rollers 51. The motor 119 is preferably controlled by the switch 109 to raise the lever 118 and allow the frame to swing down to bring the belt into driving engagement with the pipe before the motor 79 is operated to move the cut-off wheel toward the pipe. The motor 119 may be controlled by the switch 109 to swing the frame up at the same time the motor 79 swings the cut-off wheel up. Thus the pipe is given an initial turn by the belt before it is engaged by the cut-off wheel and is preferably driven at a slightly higher peripheral speed than the cut-off wheel to minimize wheel wear and insure proper cutting.

In order to hold the pipe firmly against the stop during a cutting operation the frame and belt are set at an angle to the pipe as shown. I have found that an angle of about 5° is sufficient for this purpose and will create a lengthwise wiping of the belt over the pipe urging the pipe against the stop with sufficient force to prevent an accidental spiral cut.

The ejecting mechanism

The cut-off lengths of pipe which lie between the cut-off ball 85 and the stop will drop by gravity when they are completely cut off and will be received by guide plates 121 carried by the frame 88 below the stop as best seen in Figure 4. The guide plates 121 are positioned at such a level that they will support a cut off length of pipe as indicated at 122 with its top below the level of the stop 106 but above the level of the supporting ball 85. Therefore, when the pipe is again advanced it will lie in a position as indicated at 123 in Figure 4 to engage the cut-off end 122 and force it positively along the guide plates 121 from the machine. It is contemplated that the cut-off ends so fed from the machine may be picked up by a conveyor or may be transferred from the machine to storage or to threading machines in any desired manner.

Operation

In operation with pipes loaded on the rack as seen in Figure 1 and with the driving motors of the machine running, a pipe will be fed from the rack to the supporting means by the transfer mechanism and will be advanced by the feeding rolls 51 until its forward end strikes the stop 103 and operates the control plunger 106. The control plunger will cause the feeding rolls to disengage the pipe, will cause the frame 111 to swing down to engage the belt 117 with the pipe and thereafter will cause the cut-off discs to be moved into engagement with the pipe to cut off the end thereof. At this time the pipe will rotate freely since it is supported entirely by freely rotating balls in the pedestals in the guiding device and at the cut-off position.

Use of the ball 85 at the cut-off position has a number of advantages over the rollers heretofore used to support the pipe. In the first place the ball can support the pipe freely for lengthwise movement as well as for turning. Secondly the ball turns universally to present a fresh surface to the pipe at each cut-off operation and therefore does not have grooves worn therein by the pipe ends as do the rollers. Thirdly, the ball bears on the pipe ends more forcibly than the rollers and therefore tends to roll down the burrs formed on the pipe ends by the cutting wheel.

When the end of the pipe is cut off it releases the control plunger 106 which returns the control switch 109 to its initial position to cause the feed rolls to again engage the pipe and advance it through the machine. The frame 111 and the cut off disc are elevated at this time so that the pipe can pass beneath them and the advancing pipe will engage the cut-off length and force it from the machine. As soon as the pipe being advanced engages the stop, the operation will be repeated automatically and this will continue until the entire pipe has been cut to the desired lengths. If the pipe comes out with a short end, the short end will be ejected ahead of the cut-off station and will not mix with the desired cut-off lengths.

As soon as one pipe has passed the feeding position, the control finger 74 will be released by the pipe and will cause the transfer mechanism to operate to feed a new pipe into the supporting means. Thus the operation can continue automatically as long as there is pipe on the rack.

The mechanism is very easily adjusted to handle different sizes of pipe and can be adjusted very simply and easily to cut the pipe into any desired lengths from close nipple lengths up to relatively long lengths of pipe.

While one embodiment of the invention has been shown and described in detail, it will be understood that this is illustrative only and is not to be taken as a definition of the scope of the invention, reference being had for this purpose to the appended claims.

What is claimed is:

1. A pipe cut-off machine comprising elongated supporting means for a length of pipe including movable elements engageable with the pipe to support it for rotary and longitudinal movement, a rotatable cut off wheel adjacent one end of the supporting means movable into engagement with the pipe to cut it off, feeding means engageable with the pipe to move it longitudinally, a ball mounted for universal rotating movement to engage and support the pipe on the side thereof opposite to the cut off wheel, and control means operable by the pipe in response to movement of the end thereof a predetermined distance past the cut-off wheel to move the feeding means out of engagement with the pipe and to move the cutting wheel into engagement with the pipe.

2. A pipe cut-off machine comprising elongated supporting means for a length of pipe including movable elements engageable with the pipe to support it for rotary and longitudinal movement, a rotatable cut off wheel adjacent one end of the supporting means movable into engagement with the pipe to cut it off, feeding means engageable with the pipe to move it longitudinally, a ball mounted for universal rotating movement to engage and support the pipe on the side thereof opposite to the cut off wheel, guide members engageable with the top and sides of the pipe to hold it in position on the ball, an adjustable mounting for the guide members engageable with the sides of the pipe to accommodate different pipe sizes, and control means to disengage the feeding means from the pipe and to move the cutting wheel into cutting engagement with the pipe.

3. A pipe cut-off machine comprising elongated supporting means to support a pipe for rotary and longitudinal movement, a rotary cut-off wheel adjacent to one end of the supporting means movable into engagement with the pipe to cut it off, a stop spaced from the wheel to determine the length of pipe to be cut off, and pipe driving means engaging the pipe and movable in a plane at an acute angle to the pipe length to rotate the pipe about its axis and to urge it lengthwise toward the stop.

4. A pipe cut-off machine comprising elongated supporting means to support a pipe for rotary and longitudinal movement, a rotary cut-off wheel adjacent to one end of the supporting means movable into engagement with the pipe to cut it off, a stop spaced from the wheel to determine the length of pipe to be cut off, a pipe driving device moving in a plane at an acute angle to the pipe to rotate the pipe and to urge it lengthwise toward the stop, means to move the pipe driving device into and out of driving engagement with the pipe, and control means operated by engagement of the pipe with the stop to control the last named means.

5. A pipe cut-off machine comprising elongated supporting means to support a pipe for rotary and longitudinal movement, a rotary cut-off wheel adjacent to one end of the supporting means movable into engagement with the pipe to cut it off, a stop beyond the wheel to limit lengthwise movement of the pipe, an elongated frame above the pipe at an acute angle to its length, pulleys at the ends of the frame, means to drive one of the pulleys, and a belt fitting over the pulleys and engageable with the pipe to rotate the pipe and urge it lengthwise against the stop.

6. A pipe cut-off machine comprising elongated supporting means to support a pipe for rotary and longitudinal movement, a rotary cut-off wheel adjacent to one end of the supporting means movable into engagement with the pipe to cut it off, a stop beyond the wheel to limit lengthwise movement of the pipe, an elongated frame above the pipe at an acute angle to its length, pulleys at the ends of the frame, means to drive one of the pulleys, a belt fitting over the pulleys and engageable with the pipe to rotate the pipe and urge it lengthwise against the stop, and means pivotally mounting the frame at one end for swinging movement toward and away from the pipe, a motor to swing the frame, and control means for the motor operated by engagement of the pipe with the stop.

7. A pipe cut-off machine comprising elongated supporting means to support a pipe for rotary and longitudinal movement, a rotary cut-off wheel adjacent to one end of the supporting means movable into engagement with the pipe to cut it off, feeding means engageable with the pipe to move it longitudinally, a stop engageable with the pipe to limit longitudinal movement thereof, driving means engageable with the pipe to rotate it about its axis, and control means operated by engagement of the pipe with the stop to move the feeding means out of engagement with the pipe, move the driving means into engagement with the pipe and then move the cut-off wheel into engagement with the pipe.

8. The construction of claim 7 in which the driving means is movable in a plane at an acute angle to the pipe to urge the pipe lengthwise toward the stop.

9. In a pipe cut-off machine, a rotatable cut-off wheel, means mounting the wheel for movement in its own plane toward and way from a pipe to be cut off, and supporting means to hold the pipe with its axis parallel to the wheel axis, the supporting means including a ball mounted for universal rotation about a center in the plane of the wheel and engageable with the pipe at a point spaced from the point of engagement of the wheel with the pipe.

10. In a pipe cut-off machine, supporting means to hold a pipe in a horizontal position for rotation about its axis, a rotatable cut-off wheel above the pipe with its axis parallel to the pipe, means mounting the wheel for vertical movement toward and away from the pipe, the supporting means including a ball mounted for universal rotation about a center in the plane of the wheel and engaging the bottom of the pipe, and feeding means to feed the pipe lengthwise over the ball.

11. A pipe cut-off machine comprising elongated supporting means to support a pipe for longitudinal and rotary movement, a cut-off blade adjacent to one end of the supporting means movable into engagement with the pipe to cut it off, a stop beyond the blade to limit axial movement of the pipe beyond the blade, and a driving device movable across the pipe at an acute angle to its axis to urge the pipe axially toward the stop and to rotate the pipe about its axis.

12. A pipe treating machine comprising elongated supporting means to support a pipe for rotary and longitudinal movement, treating means adjacent to one end of the supporting means to treat the pipe, a stop beyond the treating means engageable with the end of the pipe to limit longitudinal movement of the pipe beyond the treating means, and a driving device movable across the pipe at an acute angle to its axis to urge the pipe axially toward the stop and to rotate the pipe about its axis.

13. A pipe treating machine comprising elongated supporting means to support a pipe for rotary and longitudinal movement, treating means adjacent to one end of the supporting means to treat the pipe, a stop beyond the treating means engageable with the end of the pipe to limit longitudinal movement of the pipe beyond the treating means, a driving device movable across the pipe at an acute angle to its axis to urge the pipe axially toward the stop and to rotate the pipe about its axis, means to move the driving device into and out of driving engagement with the pipe, and control means operated by engagement of the pipe with the stop to control the last named means.

14. A pipe treating machine comprising elongated supporting means to support a pipe for rotary and longitudinal movement, treating means adjacent to one end of the supporting means to treat the pipe, a stop beyond the treating means engageable with the end of the pipe to limit longitudinal movement of the pipe beyond the treating means, a driving device movable across the pipe at an acute angle to its axis to urge the pipe axially toward the stop and to rotate the pipe about its axis, feeding means engageable with the pipe to advance it longitudinally, means to move the feeding means into and out of engagement with the pipe, and control means operated by engagement of a pipe with the stop to move the feeding means out of engagement with the pipe and move the driving device into engagement with the pipe.

References Cited in the file of this patent

UNITED STATES PATENTS

| | | |
|---|---|---|
| 742,223 | Patterson | Oct. 27, 1903 |
| 794,389 | Boax | July 11, 1905 |
| 826,434 | Lally | July 17, 1906 |
| 827,674 | Thompson | July 31, 1906 |
| 1,097,273 | Tyler | May 19, 1914 |
| 1,440,492 | Rankin | Jan. 2, 1923 |
| 1,481,886 | Berg | Jan. 29, 1924 |
| 1,499,537 | Kurkowski | July 1, 1924 |
| 1,568,362 | Brown | Jan. 5, 1926 |
| 1,602,588 | Podel | Oct. 12, 1926 |
| 1,610,856 | Groh | Dec. 24, 1926 |
| 1,740,430 | Mudd | Dec. 17, 1929 |
| 1,755,994 | Kurkowski | Apr. 22, 1930 |
| 1,801,038 | Ewing | Apr. 14, 1931 |
| 1,911,485 | Axlund | May 30, 1933 |
| 2,005,589 | McCoy | June 18, 1935 |
| 2,174,193 | Mickelson et al. | Sept. 26, 1939 |
| 2,252,845 | Gantzer | Aug. 19, 1941 |
| 2,272,179 | Allardt | Feb. 10, 1942 |
| 2,308,086 | Landrock | Jan. 12, 1943 |
| 2,342,246 | Brueckner | Feb. 22, 1944 |
| 2,366,443 | Deans | Jan. 2, 1945 |
| 2,387,650 | Davis | Oct. 23, 1945 |
| 2,500,685 | Johnston | Mar. 14, 1950 |
| 2,528,779 | Pinney | Nov. 7, 1950 |
| 2,554,555 | Bissell et al. | May 29, 1951 |
| 2,559,387 | Baker | July 3, 1951 |
| 2,580,279 | Briglia | Dec. 25, 1951 |
| 2,590,806 | Vorderstrasse | Mar. 25, 1952 |
| 2,597,900 | Paynter et al. | May 27, 1952 |
| 2,613,739 | Lefere | Oct. 14, 1952 |
| 2,623,445 | Robinson | Dec. 30, 1952 |
| 2,657,784 | Stoker | Nov. 3, 1953 |